US011740482B2

(12) United States Patent
Davenel

(10) Patent No.: US 11,740,482 B2
(45) Date of Patent: Aug. 29, 2023

(54) MULTISPECTRAL HARMONISATION DEVICE INTENDED FOR ALIGNING THE OPTICAL CHANNELS OF AN OPTRONIC SYSTEM

(71) Applicant: SAFRAN ELECTRONICS & DEFENSE, Paris (FR)

(72) Inventor: Arnaud Davenel, Paris (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 0 days.

(21) Appl. No.: 17/297,616

(22) PCT Filed: Dec. 9, 2019

(86) PCT No.: PCT/EP2019/084145
§ 371 (c)(1),
(2) Date: May 27, 2021

(87) PCT Pub. No.: WO2020/120362
PCT Pub. Date: Jun. 18, 2020

(65) Prior Publication Data
US 2022/0026730 A1 Jan. 27, 2022

(30) Foreign Application Priority Data
Dec. 11, 2018 (FR) ....................... 1872709

(51) Int. Cl.
*G02B 27/30* (2006.01)
*G02B 5/10* (2006.01)
(Continued)

(52) U.S. Cl.
CPC ............... *G02B 27/30* (2013.01); *G02B 5/10* (2013.01); *G02B 27/1006* (2013.01);
(Continued)

(58) Field of Classification Search
CPC .... G02B 27/30; G02B 27/62; G02B 27/1006; G02B 27/1073; G02B 27/14; G02B 5/10
(Continued)

(56) References Cited

U.S. PATENT DOCUMENTS

| 5,537,247 A * | 7/1996 | Xiao .................. G02B 21/0064 250/201.3 |
| 6,449,036 B1 * | 9/2002 | Wollmann ......... G01N 21/8901 356/601 |
| 2010/0296091 A1 * | 11/2010 | Wein .................. G02B 6/29323 356/334 |

FOREIGN PATENT DOCUMENTS

| FR | 2601148 A1 | 1/1988 |
| FR | 2647557 A2 | 11/1990 |
| FR | 2647557 A2 * | 5/1999 |

OTHER PUBLICATIONS

Feb. 28, 2020 International Search Report issued in International Patent Application No. PCT/EP2019/084145.

* cited by examiner

*Primary Examiner* — Joseph P Martinez
*Assistant Examiner* — Mitchell T Oestreich
(74) *Attorney, Agent, or Firm* — Oliff PLC; R. Brian Drozd

(57) ABSTRACT

A multispectral harmonisation device intended to align the optical channels of an optronic system that includes at least two directional optical sources emitting respective optical beams of various wavelengths belonging to various spectral bands and comprises a parabolic mirror and means for positioning and orienting each of the optical sources so that each of the optical beams emitted by the optical sources passes through the optical focus of the parabolic mirror before being reflected by said parabolic mirror so that all the
(Continued)

optical beams form, by reflection on the parabolic mirror, a multispectral collimated beam.

9 Claims, 3 Drawing Sheets

(51) Int. Cl.
    *G02B 27/10*     (2006.01)
    *G02B 27/14*     (2006.01)
    *G02B 27/62*     (2006.01)

(52) U.S. Cl.
    CPC ......... *G02B 27/1073* (2013.01); *G02B 27/14* (2013.01); *G02B 27/62* (2013.01)

(58) Field of Classification Search
    USPC .......................................................... 359/618
    See application file for complete search history.

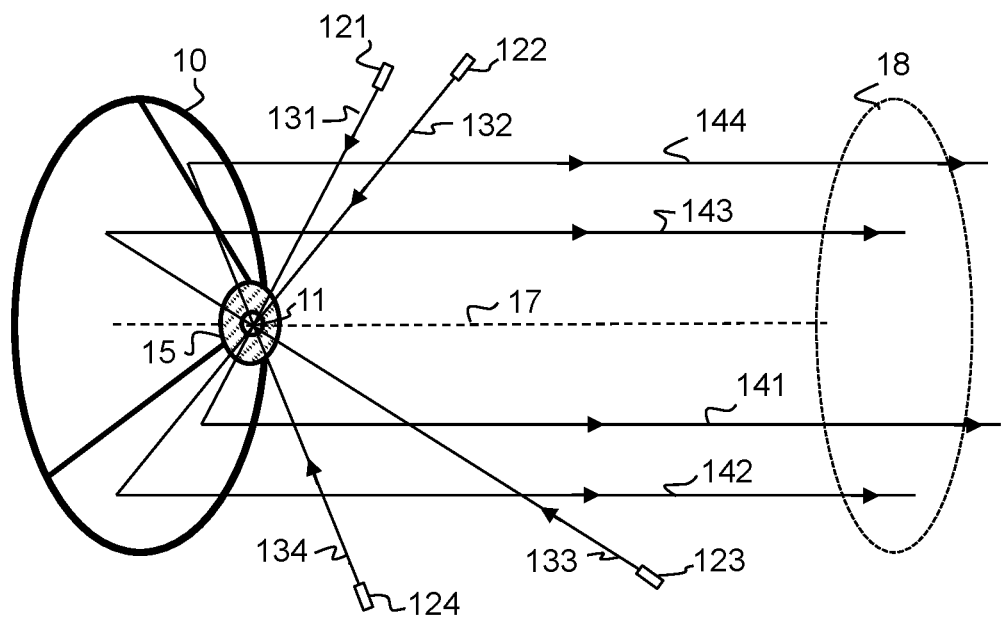
Fig. 1
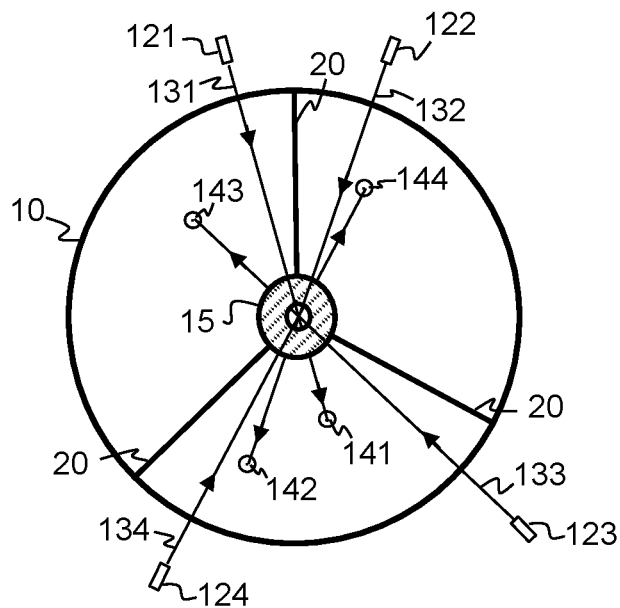 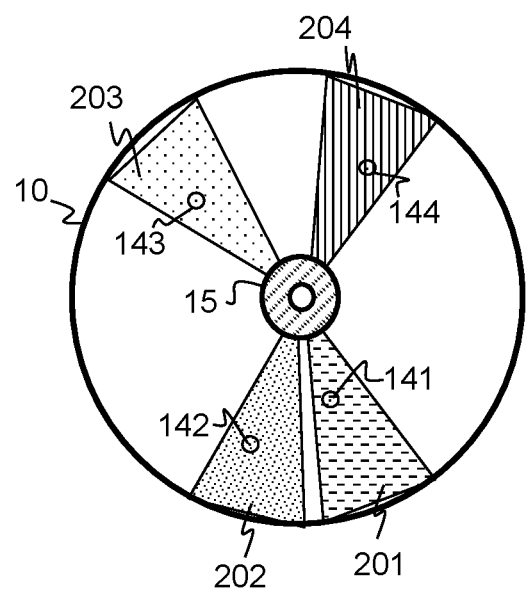
Fig. 2A  Fig. 2B

MULTISPECTRAL HARMONISATION DEVICE INTENDED FOR ALIGNING THE OPTICAL CHANNELS OF AN OPTRONIC SYSTEM

TECHNICAL FIELD

The present invention relates to devices for harmonising optical channels in various spectral bands intended to be used for adjusting optronic systems and multispectral detectors.

PRIOR ART

An optronic system consists of a plurality of detection appliances such as sensors, viewfinders or images, each of these detection appliances functioning in a spectral band that is specific thereto. For an optronic system to be efficient, it is necessary to precisely align the optical channels of these various detection appliances with respect to each other. Adjusting an optronic system consists in harmonising the various optical channels thereof, in other words adjusting the angular orientation thereof and controlling the parallelism thereof.

A device for harmonising an optronic system normally comprises a plurality of optical beams, each of these beams emitting at a specific wavelength. These various beams are oriented precisely with respect to each other by means of optical metrology systems mounted on test benches.

The various channels of an optronic system must be harmonised periodically since the alignment of optical channels of such a system has limited stability over time, which is generally briefer than the service life of the optronic system.

One problem posed for harmonising optronic systems relates to the maintenance operations in on-site environments, for example when one of the detection appliances of the optronic system must be changed. The harmonisation devices normally used have alignment constraints that cannot be met in non-standardised environments that on-site conditions constitute.

Some less constrained harmonisation devices rely on the spectral overlap of various detectors. This makes it possible, from the same optical beam, detectable in the spectral bands of a plurality of devices, to control the orientation of the channels of these appliances. However, this device does not make it possible to simultaneously adjust a plurality of optical channels in far-apart spectral bands except in some particular cases and at the cost of degradation of the performance of the appliances.

It is desirable to provide a solution that simplifies the harmonisation of the optical channels of an optronic system in various spectral bands and in particular in non-standardised environments. In particular, it is desirable to provide a solution that can be used on site and is easy to use while keeping sufficient precision for the performance of the optronic systems.

It is also desirable to provide a solution making it possible to simultaneously adjust all the optical channels of an optronic system.

It is moreover desirable to provide a solution that is easy to implement at low cost.

DISCLOSURE OF THE INVENTION

The invention relates to a device for the multispectral harmonisation of optronic systems comprising a multispectral collimated beam for aligning a plurality of optical channels.

One object of the present invention is to propose a multispectral harmonisation device intended to align the optical channels of an optronic system. The multispectral harmonisation device comprises at least two directional optical sources emitting respective optical beams of various wavelengths belonging to various spectral bands. The harmonisation device further comprises a parabolic mirror and means for positioning and orienting each of the optical sources so that each of the optical beams emitted by said optical sources passes through the optical focus of the parabolic mirror before being reflected by said parabolic mirror so that all the optical beams form, by reflection on the parabolic mirror, a multispectral collimated beam.

Thus it is possible to simultaneously adjust a plurality of optical channels of an optronic system in various spectral bands with a multispectral collimated beam.

According to a particular embodiment of the invention, the positioning and orientation means further comprise an alignment mask consisting of an opaque wall and comprising a hole. The alignment mask is placed in a plane orthogonal to the optical axis of the parabolic mirror so that the location of the hole corresponds to the optical focus of the parabolic mirror.

Thus the location of the optical focus of the parabolic mirror is concretised by a hole, which makes it possible to easily align an optical beam with the optical focus of the parabolic mirror by causing said optical beam to pass through the hole.

According to a particular embodiment of the invention, the hole is centred on the alignment mask and the dimension of the opaque wall is at least ten times greater than the dimension of said hole.

Thus the alignment mask makes it possible to intercept the incident optical beams that do not pass through the hole in the alignment mask and are therefore not aligned with the optical focus of the parabolic mirror, which facilitates the alignment of the optical beams with the optical focus of the parabolic mirror and therefore the adjustment of the position and the orientation of the sources emitting said optical beams.

According to a particular embodiment of the invention, attachment means removably assemble the alignment mask and the parabolic mirror. Thus it is possible to use the alignment mask solely during operations of positioning and orienting the light sources.

According to a particular embodiment of the invention, attachment means assemble the alignment mask and the parabolic mirror permanently and the external dimensions of the opaque wall lie between 10 and 30% of the dimensions of the parabolic mirror.

Thus it is possible to maintain the position of the alignment mask with respect to the optical focus at all times, which makes it possible to use the multispectral collimated beam at all times.

According to a particular embodiment of the invention, the face of the opaque wall oriented towards the optical sources is non-reflective.

Thus the optical beams that do not pass through the hole in the alignment mask do not generate stray optical beams by reflection on said alignment mask.

According to a particular embodiment of the invention, the attachment means are adjustable.

Thus it is possible to adjust the position of the hole with respect to the optical focus of the parabolic mirror.

According to a particular embodiment of the invention, the parabolic mirror is divided into a number of sectors equal to the number of channels of an optronic system to be harmonised, each of said sectors corresponds to a spectral band and each of the sectors is illuminated by at least one optical beam coming from at least one optical source with an emission wavelength belonging to the spectral band of the corresponding sector. Thus a sector of the parabolic mirror in a specific spectral band corresponds to each optical channel of an optronic system.

The invention also relates to a positioning system comprising a multispectral harmonisation device for which the positioning and orientation means further comprise optical detection means. Each optical detection means is sensitive to the emission wavelength of an optical source to be positioned and oriented. The positioning system is such that each optical detection means detects an optical signal at the emission wavelength of the optical source if the optical beam emitted by said optical source passes through the hole in the alignment mask and does not detect an optical signal at the emission wavelength of the optical source if the optical beam emitted by said optical source does not pass through the hole in the alignment mask. The positioning system is furthermore such that, when an optical signal at the emission wavelength of the optical source is detected, said optical detection means generates information representing the detection making it possible to validate the position and the orientation of the optical source.

Thus the positioning system makes it possible to easily implement a multispectral collimated beam.

The invention also relates to a method for positioning and orienting at least two optical sources of a multispectral harmonisation device, said sources emitting respective optical beams of various wavelengths belonging to various spectral bands. The positioning and orientation method comprises, for each of the optical sources, the following steps: installing an optical detector sensitive to the emission wavelength of said optical source to be positioned and oriented; adjusting the position and the orientation of the optical source so that the optical beam emitted by said source is directed towards the parabolic mirror and passes through a hole pierced in an alignment mask, the hole being located at the focus of said parabolic mirror; detecting, by the optical detector sensitive to the emission wavelength of the source, an optical signal at said emission wavelength of the source, characteristic of the optical beam coming from said source that has passed through the hole, and generating information representing the detection.

Thus the positioning and orientation method makes it possible to obtain a multispectral collimated beam easily.

According to a particular embodiment of the invention, the positioning and orientation method further comprises a step of installing the alignment mask so that the hole in said alignment mask is located at the focus of the parabolic mirror.

Thus the hole in the alignment mask concretises the optical focus of the parabolic mirror.

According to a particular embodiment of the invention, the positioning and orientation method further comprises a step consisting in removing the optical detector sensitive to the emission wavelength of the source when the position and the orientation of said optical source are validated.

Thus the position and the orientation of each source are adjusted with an optical detector adapted to the emission wavelength of the source and an optical detector cannot form an obstacle to the detection, by another optical detector, of an optical beam.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 1 illustrates schematically a multispectral harmonisation device comprising a multispectral collimated beam;

FIG. 2A illustrates schematically in front view the multispectral harmonisation device comprising a multispectral collimated beam;

FIG. 2B illustrates schematically in front view the multispectral harmonisation device with the division of the parabolic mirror into a plurality of sectors;

DETAILED DISCLOSURE OF EMBODIMENTS

Figure 3:
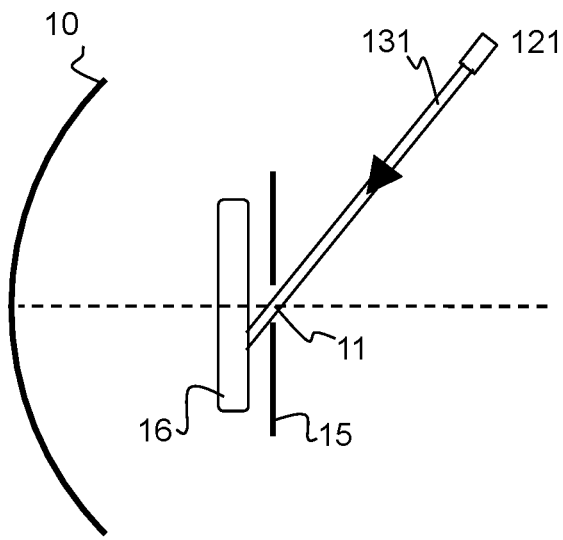
FIG. 3 illustrates schematically a first positioning system for using the multispectral harmonisation device.

The present invention consists of a device for harmonising optronic systems comprising a multispectral collimated beam.

FIG. 1 illustrates schematically a harmonisation device comprising a multispectral collimated beam.

The device for harmonising optronic systems comprises a parabolic mirror 10 on which incident optical beams 131, 132, 133, 134 coming respectively from sources 121, 122, 123 and 124 come to be reflected. Said sources 121 to 124 are light sources that emit directional optical beams, spatially and temporally coherent, such as for example laser diodes. The incident optical beams 131, 132, 133 and 134 respectively emitted by the sources 121, 122, 123 and 124 are of different wavelengths. Reflected optical beams 141, 142, 143 and 144 result respectively from the reflection of the incident optical beams 131, 132, 133 and 134 on the parabolic mirror 10. The harmonisation device also comprises positioning and orientation means for positioning and orienting the sources 121 to 124 so that the incident optical beams 131 to 134 are emitted towards the parabolic mirror 10 in a propagation direction that passes through the optical focus 11 of said parabolic mirror 10. The direction of propagation of the reflected optical beams 141 to 144 is consequently parallel to the optical axis 17 of the parabolic mirror 10. The reflected optical beams 141 to 144 are thus parallel to each other. In other words, a beam 18 consisting of all these reflected optical beams 141 to 144 is collimated.

In addition, the reflected optical beams 141, 142, 143 and 144, coming from the reflection on the parabolic mirror 10 of the respective incident optical beams 131, 132, 133 and 134, have different wavelengths that correspond respectively to those emitted by the sources 121, 122, 123 and 124. The various wavelengths may relate to various bands of the electromagnetic spectrum, for example spectral bands of the visible range and of the infrared range. The beam 18 consisting of all the reflected optical beams 141 to 144 is referred to as a multispectral beam.

The sources 121 to 124 are positioned and oriented by the positioning and orientation means so that each of the incident beams 131 to 134 is directed towards the parabolic mirror 10, in a space delimited by the opening in said parabolic mirror 10. In addition, the positioning and orientation means make it possible to position said sources 121 to 124 outside the field of the parabolic mirror 10 and outside the diameter of said parabolic mirror 10. In other words, the sources are located outside the zone where the reflected optical beams 141 to 144 propagate so that said reflected optical beams 141 to 144 are not intercepted by one of the sources 121 to 124.

The positioning and orientation means may comprise an alignment mask 15. The alignment mask 15 comprises a preferentially opaque wall, and a hole, for example disposed at its centre, is disposed so that the hole in the alignment mask is at the optical focus 11 of the parabolic mirror 10. The hole in the alignment mask 15 concretises the location of the optical focus 11. The positioning and orientation means make it possible to position and orient the sources 121 to 124 so that the optical beam emitted by each source passes through the hole in the alignment mask 15, and therefore through the optical focus 11 of the parabolic mirror 10. The alignment mask 15 is preferentially placed in a plane orthogonal to the optical axis 17 of the parabolic mirror 10.

The diameter of the hole in the alignment mask 15 is variable according to the precision of alignment sought for adjusting optical channels of an optronic system. The divergence of the reflected optical beams 141 to 144 after the incident optical beams 131 to 134 have passed through the hole in the alignment mask depends on the apparent opening of the hole and therefore on the dimension of the hole as well as the focal distance of the parabolic mirror 10. The divergence of the beams or angular dispersion must be small compared with the precision sought on the angular orientation. For example, for holes with a width of 1% and 0.1% of the distance between the optical focus and the centre of the parabolic mirror, the divergence at 90% of the energy is equal respectively to +/−0.31° (i.e. 5.4 mrad) and +/−0.031° (i.e. 0.55 mrad), which makes it possible to make an alignment of optical channels of an optronic system with angular precisions of the order respectively of 1° and 0.1°.

The function of the alignment mask 15 is to at least partly intercept incident optical beams that are not oriented to pass through the hole in the alignment mask 15, and this in order to facilitate the operation of positioning and orienting the sources 121 to 124 and therefore the use of the multispectral harmonisation device. For this purpose, the wall of the alignment mask 15 has a surface with a dimension at least ten times greater than that of the hole.

The alignment mask 15 may be removable. It is in this case installed at the optical focus 11 of the parabolic mirror 10 during operations of positioning and orienting the sources 121 to 124 and then removed during the use of the multispectral collimated beam 18 for adjusting optical channels of an optronic system. The external dimensions of the alignment mask 15 may in this case be as great as the dimensions of the parabolic mirror 10, which facilitates the operation of positioning and orienting the sources 121 to 124 and in particular the alignment of the incident optical beams 131 to 134 emitted by said sources 121 to 124 with the optical focus 11 of the parabolic mirror 10 and a point on the parabolic mirror 10. Moreover, when said removable alignment mask 15 is removed, the divergence of the reflected optical beams 141 to 144 depends in this case on the diameter of the optical beams.

The alignment mask may also be attached to the mirror permanently, which makes it possible to locate the optical focus 11 of said parabolic mirror 10 at any moment. The positioning and the orientation of the sources so that the incident optical beams 131 to 134 pass through the hole in the alignment mask 15 can thus be implemented easily, without having recourse to other adjustment means. The permanent attachment of the alignment mask 15 on the parabolic mirror 10 makes it possible to easily transport the optronic-system harmonisation device of the present invention and to use it in various environments. In this case, the external dimensions of the alignment mask 15 are sufficiently small for the reflected optical beams 141 to 144 not to be intercepted by the alignment mask 15. For example, an alignment mask 15 circular in shape has an outside diameter equal to 10 to 30% of the diameter of the parabolic mirror 10. In addition, the surface of the alignment mask 15 oriented facing the sources 121 to 124 is preferably non-reflective so as to avoid stray reflections in uncontrolled propagation directions.

FIG. 2A presents in front view the multispectral harmonisation device comprising a multispectral collimated beam. The sources 121, 122, 123 and 124, emitting at various wavelengths, are located outside the field of the parabolic mirror 10 external to the diameter of said parabolic mirror 10 and emitting an optical signal in the direction of said parabolic mirror 10 in the form of incident optical beams 131 to 134, the direction of propagation of which passes through the optical focus 11 of said parabolic mirror 10, said optical focus 11 being concretised by the central hole in the alignment mask 15. The incident optical beams 131 to 134 are next reflected by said parabolic mirror 10 generating reflected optical beams 141 to 144 parallel to each other.

The alignment mask 15 may be attached to the parabolic mirror 10 by means of fasteners 20. Said attachment fasteners 20 are preferably adjustable in order to be able to adjust the position of the hole with respect to the optical focus 11 of the parabolic mirror 10.

FIG. 2B illustrates schematically in front view the multispectral harmonisation device divided into a plurality of sectors. The parabolic mirror 10 is divided into a number of sectors 201 to 204 defined by the number of optical channels of an optronic system to be harmonised. On each of these sectors 201 to 204, one or more incident optical beams are reflected, the wavelength or wavelengths of which belong to the same range of wavelengths characteristic of the spectral band of one of the optical channels of an optronic system. Thus each sector corresponds to the emission of one or more optical beams reflected in a spectral band. In the example of FIG. 2b, the reflected optical beam 141 with an emission wavelength of the source 121 is reflected on the sector 201, just as the reflected optical beams 142, 143 and 144 with emission wavelengths of the respective sources 122, 123 and 124 are reflected on the respective sectors 202, 203 and 204.

In the example in FIG. 1, FIG. 2A and FIG. 2B, four sources generating four incident optical beams and therefore four reflected optical beams are shown. A greater or lesser number of sources and therefore of incident and reflected optical beams may of course be used by the present invention.

FIG. 3 illustrates in cross sectional view a first positioning system for using the multispectral harmonisation device.

The use of the multispectral collimated beam 18 by the multispectral harmonisation device of the present invention involves the positioning and the orientation of the sources 121 to 124 so that the optical beams emitted by said sources pass through the optical focus 11 of the parabolic mirror 10 and makes it possible to control the parallelism of the optical beams 141 to 144.

The positioning system comprises a detector 16 for checking the position and the orientation of a source 121 and the passage of an incident optical beam 131 through the optical focus 11 of the parabolic mirror 10. The detector 16 sensitive to the wavelength emitted by the source 121, for example an optical flow sensor, is placed between the alignment mask 15 and the parabolic mirror 10 so as to be able to detect any incident optical beam that passes through the alignment mask 15 while passing through the hole. The detector 16 has a detection surface with a dimension less than that of the alignment mask 15 in order to detect only the optical signals passing through the hole and thus to avoid detecting optical signals coming from a source and that would be emitted in the direction of the parabolic mirror 10 while passing outside the alignment mask 15.

The source 121 is positioned and oriented by using positioning and orientation means so that the incident optical beam 131 emitted by said source 121 is directed towards the hole in the alignment mask 15 and passes through said hole in the direction of the parabolic mirror 10. If the source 121 is correctly positioned, the detector 16 detects, through the hole, an optical signal characteristic of the incident optical beam 131, for example an optical signal at the emission wavelength of the source 121. Said detector 16 then generates information representing this detection and therefore representing said detected optical signal characterising the passage of the beam 131 through the hole, which makes it possible to validate the position and the orientation of the source 121.

If the detector 16 is an optical flow sensor, the adjustment of the position and of the orientation of the source 121 is optimised when the flow detected is maximum, which corresponds to a maximum flow of the incident optical beam 131 emitted by the source passing through the alignment mask through the hole in said alignment mask 15. This optimisation makes it possible to adjust with precision the position and the orientation of the source 121. When the incident optical beam 131 does not pass through the optical focus 11 of the parabolic mirror 10, it can be intercepted by the alignment mask 15 or be emitted in the direction of the parabolic mirror 10 outside the alignment mask 15. The detector 16 then does not detect any optical signal characteristic of the incident optical beam 131, for example no optical signal at the emission wavelength of the source 121. The position and/or the orientation of the source 121 must in this case be modified until the detector 16 detects an optical signal characteristic of the incident optical beam 131 and then generates information representing this detection that validates the position and the orientation of the source.

When the position and the orientation of a first source 121 are validated, the position and the orientation of a second source 122 are adjusted by proceeding in the same way as for the first source 121 using a detector sensitive to the wavelength emitted by said source 122 replacing the detector 16. The same applies for the following sources.

Figure 4:
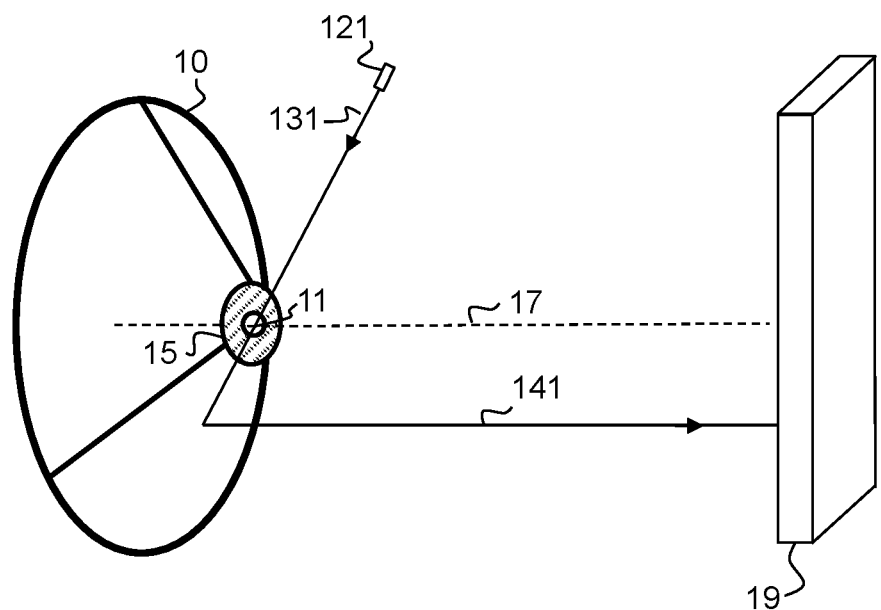
FIG. 4 illustrates schematically a second positioning system for using the multispectral harmonisation device.

FIG. 4 illustrates schematically a second positioning system for using the multispectral harmonisation device.

The positioning system comprises in this example a detector 19, sensitive to the wavelength emitted by the source 121, and making it possible to check the position and the orientation of a source 121. The detector 19 is oriented in the direction of the parabolic mirror 10 and positioned opposite said parabolic mirror 10 with respect to the alignment mask 15. The detector 19 is preferably placed in a plane orthogonal to the optical axis and centred on the optical axis 17. When the incident optical beam 131 emitted by the source 121 passes through the hole in the alignment mask 15 and therefore through the optical focus 11, the reflected optical beam 141 propagates parallel to the optical axis 17 and is detected by the detector 19. Said detector 19 then generates information representing said detected optical signal making it possible to validate the position and the orientation of the source 121.

The detection surface area of the detector 19 is at least equal to the opening in the parabolic mirror 10 so that any optical beam reflected by the parabolic mirror 10 parallel to the optical axis 17 is actually detected by the detector 19.

If the detector 19 has a surface area greater than the opening in the parabolic mirror 10, it is necessary also to ensure that an optical beam reflected by the parabolic mirror 10 in a direction not parallel to the optical axis 17 cannot be detected by the detector 19, for example by sufficiently moving the detector 19 away from the parabolic mirror 10. The minimum distance between the optical focus 11 and the detector 19 depends on the outside diameter of the alignment mask 15, on the dimensions of the detector 19 and on the focal distance of the parabolic mirror 10. This distance makes it possible to avoid an incident optical beam emitted by a source in the direction of the parabolic mirror 10 but passing outside the alignment mask 15 being detected by the detector 19 and causing an erroneous validation of the positioning of the source 121.

When the position and the orientation of a first source 121 are validated, the position and the orientation of a second source 122 are adjusted by proceeding in the same way as for the first source 121 using a detector sensitive to the wavelength emitted by said source 122, which replaces the detector 19. The same applies for the following sources.

Figure 5:
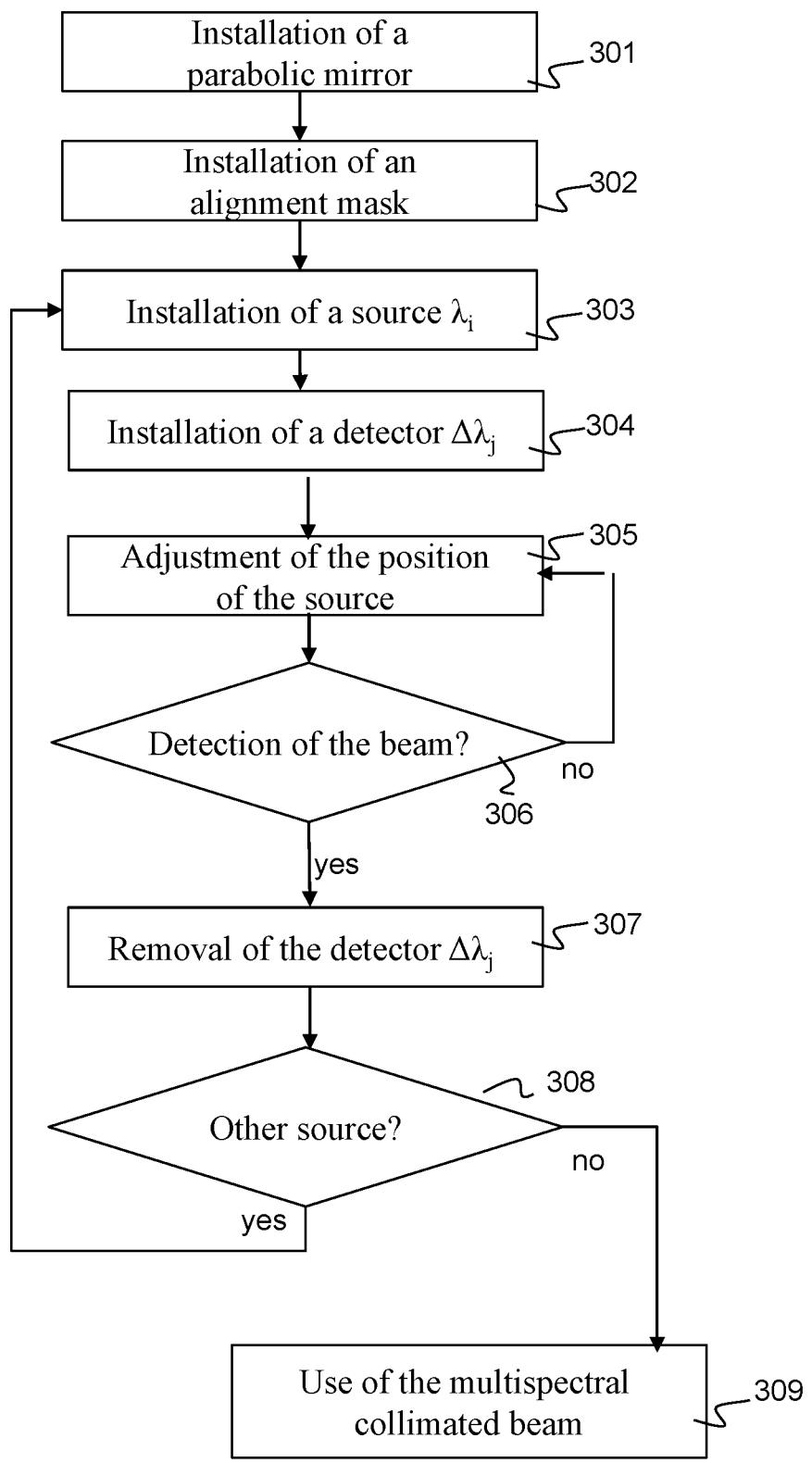
FIG. 5 illustrates schematically a method for positioning and orienting the sources for using the multispectral harmonisation device.

FIG. 5 illustrates schematically a method for positioning and orienting the sources for using the multispectral harmonisation device.

In a step 301, the parabolic mirror 10 is installed. In a step 302, the alignment mask 15 is positioned with respect to the parabolic mirror 10 so that the hole in the alignment mask 15 coincides with the optical focus 11 of the parabolic mirror 10.

In a step 303, a source emitting a beam of wavelength $\lambda_i$, for example the source 121 emitting at the wavelength $\lambda_1$, is installed outside the field of the parabolic mirror 10 so that the optical beam emitted by said source is directed towards the parabolic mirror 10. In a step 304, a detector, of spectral band $\Delta\lambda_j$ including the wavelength $\lambda_i$ emitted by the source to be aligned, is positioned so as to detect, through the hole in the alignment mask 15, an optical signal corresponding to an optical beam coming from said source. For example, the detector 16 of spectral band $\Delta\lambda_{10}$ including the wavelength $\lambda_1$ emitted by the source 121 is placed between the alignment mask 15 and the parabolic mirror 10 so as to be able to detect an incident optical beam 131. Another example consists of installing the detector 19 of spectral band $\Delta\lambda_{11}$ facing the parabolic mirror 10 so as to be able to detect a reflected optical beam 141 of wavelength $\lambda_1$ coming from the source 121.

In a step 305, the position and the orientation of the source are adjusted with respect to the assembly formed by the parabolic mirror 10 and the alignment mask 15 so that the optical beam emitted by said source, for example the incident optical beam 131 emitted by the source 121, passes through the hole in the alignment mask 15.

In a step 306, the position and the orientation of the source with respect to the alignment mask 15 are checked. If the position and the orientation are correct, the detector of spectral band $\Delta\lambda_j$ detects an optical signal of wavelength $\lambda_i$ and generates information representing the detection of said optical signal, which validates the positioning and the orientation of the source and causes the performance of a step 307. If the position and the orientation are incorrect, the detector does not detect an optical signal at the wavelength $\lambda_i$ and the step 305 is reiterated. For example, if the incident optical beam 131 is detected by the detector 16, the position and the orientation of the source 121 are validated in order to pass to the step 307. If the detector 16 does not detect the incident optical beam 131, the step 305 is reiterated and the position and the orientation of the source 121 are once again adjusted with respect to the alignment mask 15 until an optical signal is detected by the detector 16.

In a particular embodiment, the adjustment of the position and of the orientation of the source is optimised by means of the use of a detector such as an optical flow sensor. In this case, the position and the orientation of the source are optimised when the flow detected is maximum, which corresponds to a maximum flow of the incident optical beam emitted by the source passing through the alignment mask through the hole in said alignment mask 15.

The step 307 consists in removing the detector of spectral band $\Delta\lambda_j$, such as for example the detector 16, from the system.

A step 308 consists in identifying whether the position and the orientation of at least one other source must be adjusted. If such is the case, the step 303 is then repeated, which corresponds to the installation of another source emitting a beam with a different wavelength $\lambda_i$, for example the source 122 emitting at the wavelength $\lambda_2$. Then the following steps 304 to 308 are in their turn repeated. If all the sources are correctly positioned and oriented, the use of the multispectral harmonisation device is complete and a step 309 is performed.

In the step 309, the multispectral collimated beam 18 generated by said multispectral harmonisation device can be used for performing the harmonisation operations of an optronic system, in particular to align the various channels of an optronic system in various spectral bands.

In a particular embodiment, if the use of the multispectral harmonisation device involves the successive adjustment of the positioning and of the orientation of two sources 121 and 122 emitting at respective wavelengths $\lambda_1$ and $\lambda_2$ that are different but both belonging to the spectral band $\Delta\lambda_{12}$ of the same detector D1, the detector D1 used in the adjustment of the position and of the orientation of the source 121 can be left in place after the validation of the position and of the orientation of the source 121: it is then possible to pass directly from the step 306 to the step 308. During the adjustment of the position and of the orientation of the source 122 and after the installation of said source 122 at the step 303, the detector D1 already being in place, it is then not necessary to comply with the step 304.

The invention claimed is:

1. A multispectral harmonisation device intended to align the optical channels of an optronic system and comprising:
   at least two directional optical sources emitting respective optical beams of various wavelengths belonging to various spectral bands;
   a parabolic mirror; and
   positioning and orientation means comprising an alignment mask comprising an opaque wall and a hole, said alignment mask being disposed (1)at a location so that the hole of the alignment mask is at an optical focus of the parabolic mirror and (2) so that each of the optical beams emitted by said at least two directional optical sources passes through the optical focus of the parabolic mirror before being reflected by said parabolic mirror so that all the optical beams form, by reflection on the parabolic mirror, a multispectral collimated beam, wherein the at least two directional optical sources comprises at least two distinct optical sources.

2. The multispectral harmonisation device according to claim 1, wherein the hole is centred on the alignment mask and in that a width of the opaque wall is at least ten times greater than a width of said hole.

3. The multispectral harmonisation device according to claim 1, wherein at least one fastener removably assembles the alignment mask and the parabolic mirror.

4. The multispectral harmonisation device according to claim 1, wherein at least one fastener assembles the alignment mask and the parabolic mirror permanently and wherein a width of the opaque wall is between 10 and 30% of a width of the parabolic mirror.

5. The multispectral harmonisation device according to claim 4, wherein a face of the opaque wall oriented towards the optical sources is non- reflective so that light hitting the face do not result in reflections from the face.

6. The multispectral harmonisation device according to claim 3, wherein the at least one fastener is adjustable.

7. The multispectral harmonisation device according to claim 1, wherein the parabolic mirror is divided into a number of sectors equal to the number of channels of an optronic system to be harmonised, each of said sectors corresponds to a spectral band, and in that at least one optical beam coming from at least one optical source with an emission wavelength belonging to the spectral band of the corresponding sector is reflected on each of the sectors.

8. A positioning system comprising:
   the multispectral harmonisation device according to claim 1,
   wherein the positioning and orientation means further comprises an optical detector comprising a sensor that is configured to be sensitive to an emission wavelength of an optical source to be positioned and oriented,
   each optical detector detects an optical signal at the emission wavelength of the optical source if the optical beam emitted by said optical source passes through the hole in the alignment mask and does not detect an optical signal at the emission wavelength of the optical source if the optical beam emitted by said optical source does not pass through the hole in the alignment mask, and
   wherein, when an optical signal at the emission wavelength of the optical source is detected, said optical detector generates information representing the detection in order to validate a position and orientation of the optical source.

9. A method for positioning and orienting at least two optical sources of a multispectral harmonisation device, said at least two optical sources emitting respective optical beams of various wavelengths belonging to various spectral bands, wherein the at least two optical sources comprises two or more distinct optical sources, and wherein the method comprises, for each of the optical sources:
   installing an optical detector sensitive to the emission wavelength of said optical source to be positioned and oriented;
   adjusting a position and orientation of the optical source so that an optical beam emitted by said source is directed towards a parabolic mirror and passes through a hole in an alignment mask, the alignment mask comprising an opaque wall with the hole and being placed in a plane orthogonal to an optical axis of the parabolic mirror, the hole being located at an optical focus of said parabolic mirror; and
   detecting, by the optical detector sensitive to the emission wavelength of the optical source, an optical signal at said emission wavelength of the optical source, characteristic of the optical beam coming from said optical source that has passed through the hole, and generating information representing the detection.

\* \* \* \* \*